United States Patent

Hasegawa et al.

[11] Patent Number: 5,638,203
[45] Date of Patent: Jun. 10, 1997

[54] LIQUID CRYSTAL ELECTROOPTICAL DEVICE

[75] Inventors: Masaki Hasegawa, Kamakur; Fuminori Sai; Fumiaki Yamada, both of Yokohama, all of Japan

[73] Assignee: International Business Machines Corporation, Armonk, N.Y.

[21] Appl. No.: 706,484

[22] Filed: Sep. 4, 1996

Related U.S. Application Data

[63] Continuation of Ser. No. 313,530, Sep. 27, 1994, abandoned.

[30] Foreign Application Priority Data

Sep. 29, 1993 [JP] Japan ................... 5-242341

[51] Int. Cl.⁶ ............... G02F 1/1343; G02F 1/13
[52] U.S. Cl. ....................... 349/139; 349/171
[58] Field of Search ............... 359/87, 100, 56, 359/84

[56] References Cited

U.S. PATENT DOCUMENTS

| | | | |
|---|---|---|---|
| 3,772,874 | 11/1973 | Lefkowitz | 359/87 |
| 5,165,076 | 11/1992 | Tsuboyama | 359/100 |
| 5,313,562 | 5/1994 | Wiltshire | 359/87 |

FOREIGN PATENT DOCUMENTS

| | | | |
|---|---|---|---|
| 2194231 | 8/1987 | Japan | 359/87 |
| 987564 | 1/1983 | Russian Federation | 359/87 |

*Primary Examiner*—William L. Sikes
*Assistant Examiner*—Tiep H. Nguyen
*Attorney, Agent, or Firm*—Robert B. Martin

[57] ABSTRACT

The present invention relates to obtain an electrooptical device having a high response speed by using a spontaneously polarized ferroelectric liquid crystal. Spontaneously polarized ferroelectric liquid crystal in the smectic-A state is sealed into a proper transparent case. An electric field is applied perpendicularly to a light path direction so as to change the orientation directions of liquid crystal molecules, thereby changing the refractive index distribution. A liquid crystal electrooptical device having both deflection and focusing functions is provided by adjusting the shape of the electrodes while maintaining the polarization state of an input light beam.

2 Claims, 7 Drawing Sheets

Shapes of conductive surfaces in contact with liquid crystal orientation film

FIG. 6

Example of combining two devices through lenses

Example of unifying two devices

Constitution for realizing biaxial lens action

LIQUID CRYSTAL ELECTROOPTICAL DEVICE

This is a continuation of application Ser. No. 08/313,530 filed on Sep. 27, 1994 now abandoned.

FIELD OF THE INVENTION

The present invention relates to a liquid crystal electrooptical device for changing an optical path by utilizing the electric-field-induced inclination of liquid crystal molecules, thereby realizing various functions such as light deflection.

BACKGROUND OF THE INVENTION

Among the functions of conventional electrooptical devices is light deflection. While optical deflectors are used in various devices, most of them operate on mechanical motion. In a laser printer, laser light is deflected by reflection using a polygon mirror which is rotated to continuously change the direction of its mirror face.

In the tracking mechanism of a magnetooptical disk device, a light beam is deflected by moving a lens to the right or left, or by changing the direction of a reflecting mirror. However, in the above examples, the mechanism is complex, adjustments are difficult to perform in assembly, and it is vulnerable to vibration. The deflection speed is limited by the size and weight of mechanical parts. Furthermore, the power consumption increases with the deflection speed.

To solve the above problems, optical deflectors having no mechanical motion which include a variable diffraction grating using a surface acoustic wave (SAW) device are proposed. In this grating deflector, to deflect a light beam, a SAW device is formed in a waveguide and the lattice interval is varied by changing the acoustic wave frequency. However, this deflector is low in diffraction efficiency and is therefore low in light utilization factor. In addition, this deflecting device is difficult to manufacture. To solve these problems, several liquid-crystal-based deflectors have been proposed which can be manufactured easily and can provide a wide variable range in the refractive index.

For example, a deflector which deflects a light beam by changing the orientation of a liquid crystal by applying a high voltage between two electrodes was proposed in each of A. F. Fray and D. Jones, "Large-Angle Beam Deflector Using Liquid Crystal," Electo. Lett., Vol. 11, pp. 358 (1975) and A. Sasaski and T. Ishibashi, "Liquid-Crystal Light Deflector," Electo. Lett., Vol. 15, pp. 239 (1979). A variable diffraction grating utilizing a DC-current-induced Williams domain was proposed in K. Okano and S. Kobayashi, "Applications of Liquid Crystals" (in Japanese), Baifukan Co., Ltd., pp. 213 (1989). A deflector utilizing the switching by total reflection was proposed in each of G. Labrunie and S. Valette, "Nematic Liquid Crystal Digital Light Deflector," Appl. Opt. Vol. 13, pp. 1802 (1974) and R. A. Kashnow and C. R. Stein, "Total-Reflection Liquid-Crystal, Electro-Optic Device," Appl. Opt., Vol. 12, pp. 2309 (1973). Furthermore, there was proposed a deflector in which an optical path difference is produced by a linearly varying refractive index distribution that is generated by an electric field gradient.

In the deflectors using a high voltage, it is difficult to control the electric field distribution and, therefore, a beam shape is likely to be distorted. In the device utilizing the Williams domain, the light utilization factor is low as in the case of using the SAW device and the deflection angle depends on the light wavelength. The devices utilizing the total reflection can deflect a light beam in only two directions. In the device utilizing an electric field gradient, since a light beam is introduced in parallel with an electric field applied to a liquid crystal, the device needs to be made thinner to improve the response speed, which necessarily reduces the deflection angle. Conversely, to increase the deflection angle, the device becomes thicker, which results in a lower response speed. That is, a dilemma exists between the response speed and the deflection angle.

Another important function of electrooptical devices is focusing. A mechanism for focusing light is employed in many kinds of devices, and in most of such mechanisms a lens is moved mechanically. In autofocus cameras, various types of actuators have been developed to change distances between lenses to thereby change the focal length of a combination of the lenses. In a focusing mechanism for magnetooptical disk devices, the focus point is changed by moving a lens vertically. However, in these focusing mechanisms, the mechanism itself is complex and vulnerable to vibration, and adjustments in assembly are difficult. The focus varying speed has a limitation depending on sizes and weights of mechanical parts. Furthermore, the power consumption increases along with the focus varying speed.

To solve the above problems, liquid-crystal-based variable focus lenses have been proposed which do not involve mechanical motion. With the advantages that the device can be produced easily and that the refractive index can be changed over a wide range, liquid crystals have been applied to a variety of devices. For example, a device in which a liquid crystal is given a lens-like refractive index distribution by forming fine electrodes on a pair of glass plates and properly controlling voltages applied to the respective electrodes was proposed in Patrick F. Brinkley, Stephaen T. Kowel and Chinghua Chu, "Liquid Crystal Adaptive Lens: Beam Translation and Field Meshing," Applied Optics, Vol. 27, pp. 4578 (1989). A variable refractive index Fresnel lens constituted by injecting a liquid crystal between two glass plates, one of which is formed into a Fresnel lens, was proposed in S. Sato, A. Sugiyama and R. Sato, "Variable-Focus Liquid-Crystal Fresnel Lens," Jpn. J. Appl. Phys., Vol. 24, L626 (1985). A device in which a liquid crystal is placed on a condensing diffraction grating formed on a light waveguide was proposed in Technical Materials of the '90 Optical Disk Conference (in Japanese), Optoelectronic Industry and Technology Development Association, pp. 71 (1992). A device for producing a lens effect by forming a non-uniform electric field by means of a concentric electrode pattern was proposed in S. Masuda, T. Nose and S. Sato, "Optical Characteristics and Molecule Orientations in a Hybrid Orientation Liquid Crystal Electrooptical Microlens" (in Japanese), Optics, Vol. 20, pp. 232 (1991).

In the method of controlling the refractive index by fine electrodes, very fine electrodes are required to produce fair wavefronts of output light. In the device using a Fresnel lens and a diffraction grating, a wavelength dispersion occurs because the focal length varies with the wavelength. Furthermore, since a light beam is introduced in parallel with an electric field applied to the liquid crystal, the device needs to be made thinner to increase the response speed, resulting in an increase of the lens focal length. Conversely, the device needs to be made thicker to decrease the focal length, resulting in a slow response speed. That is, a dilemma exists between the response speed and the focal length. In the device of generating an electric field by the concentric pattern, the electric field distribution is difficult to control and a light beam suffers from large aberrations.

To avoid the above-mentioned problem of optical aberrations, Published Unexamined Patent Application No.

5-206241 discloses a device which performs deflection of a light beam by applying a continuously varying electric field to a nematic liquid crystal utilizing its property that the refractive index changes linearly with respect the electric field.

Nematic liquid crystals have a problem in that the change of the orientation of the liquid crystal molecular axes takes a long time from the application of an electric field, because they do not have spontaneous polarization, a property that a material itself is polarized without application of an external electric field. That is, this type of device is inferior in the response speed and, therefore, not suitable for applications which require a high response speed, such as a switching element used in optical communication.

In ferroelectric liquid crystals, polarization vectors of liquid crystal molecules incline so as to match the direction of an electric field in the smectic-A phase (electric-field-induced inclination). In the case of nematic liquid crystals, however, polarization occurs only after the application of an electric field. In terms of response speed, liquid crystals having spontaneous polarization are superior to nematic liquid crystals. In addition, since the response speed of the orientation with respect to the electric field increases with the magnitude of polarization, the use of a liquid crystal having a large spontaneous polarization is effective in improving the response speed.

Furthermore, it should be considered that the response speed decreases with the operation voltage. In conventional deflectors using a nematic liquid crystal, in which an electric field is applied parallel with the light incidence direction, the optical path length within the liquid crystal needs to be increased to obtain a large deflection angle. Therefore, the electrode interval becomes long, and the operation voltage needs to be increased to generate a desired electric field.

Therefore, an object of the present invention is to improve the response speed of a deflector using a nematic liquid crystal while maintaining its advantages that no disorder occurs in the wavefronts of a deflected light beam, the light utilization factor is high, and there is no mechanical parts, i.e., moving parts.

More specifically, an object of the invention is to provide a deflector which can be driven by a small operating voltage and has a high response speed, by removing the correlation between the deflection angle and the operation voltage by using a ferroelectric liquid crystal having spontaneous polarization, and employing an arrangement in which a light path direction and an electric field direction are not in parallel with each other.

SUMMARY OF THE INVENTION

To attain the above objects, according to the invention, a spontaneously polarized ferroelectric liquid crystal is oriented in advance in a predetermined direction, and sealed into a proper transparent case. An electric field is applied perpendicularly to a light path direction so as to change the orientation directions of liquid crystal molecules thereby changing the refractive index distribution. A liquid crystal electrooptical device having both deflection and focusing functions is provided by adjusting the shape of electrodes while maintaining the polarization state of an input light beam.

DETAILED DESCRIPTION OF THE INVENTION

Figure 1:
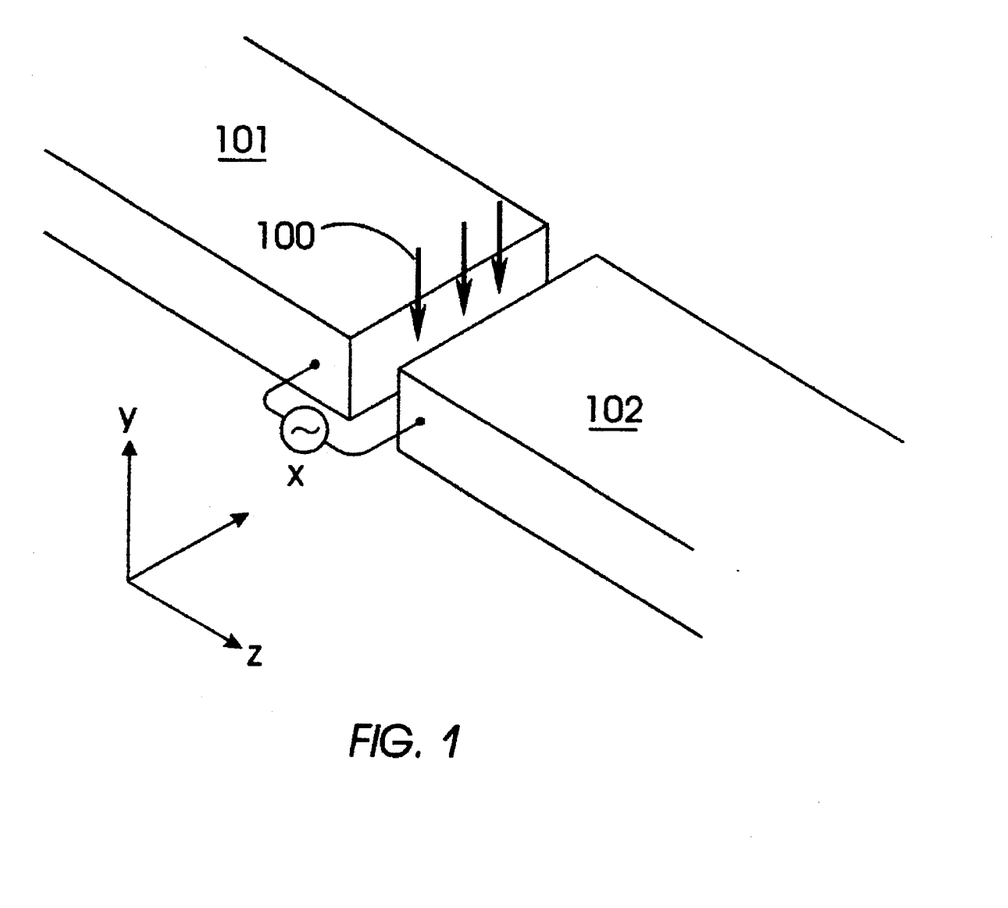
FIG. 1 is a conceptual diagram showing a light deflection method according to the present invention.

FIG. 1 schematically shows a device according to the present invention. A spontaneously polarized liquid crystal fills a space between two opposing electrodes 101 and 102, and an electric field is applied in the z-direction. Liquid crystal molecules are layered in the smectic-A state so that their major axes are arranged in a predetermined direction. Upon application of an electric field, the molecular axes are uniformly inclined in accordance with the electric field (the electric-field-induced inclination effect).

Figure 2A:
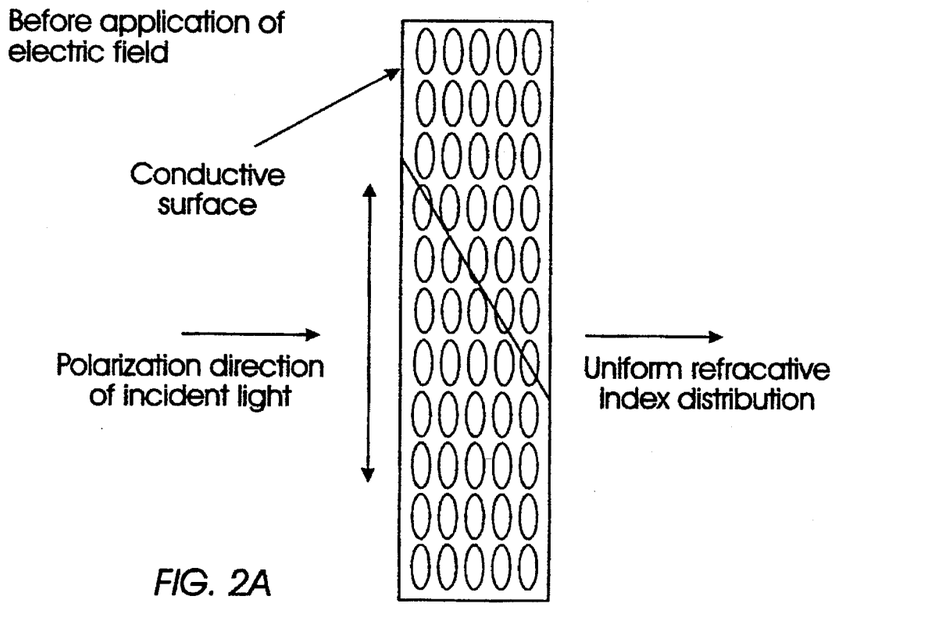
FIG. 2 illustrates an electric-field-induced inclination effect of a liquid crystal and a principle of deflection resulting from it.
Figure 2B:
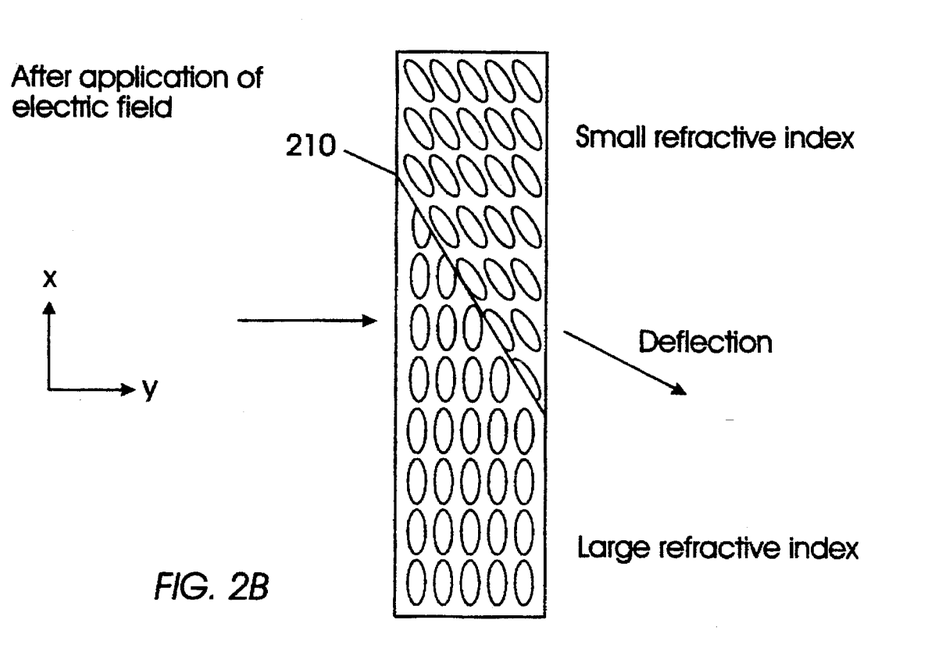
Figure 3:
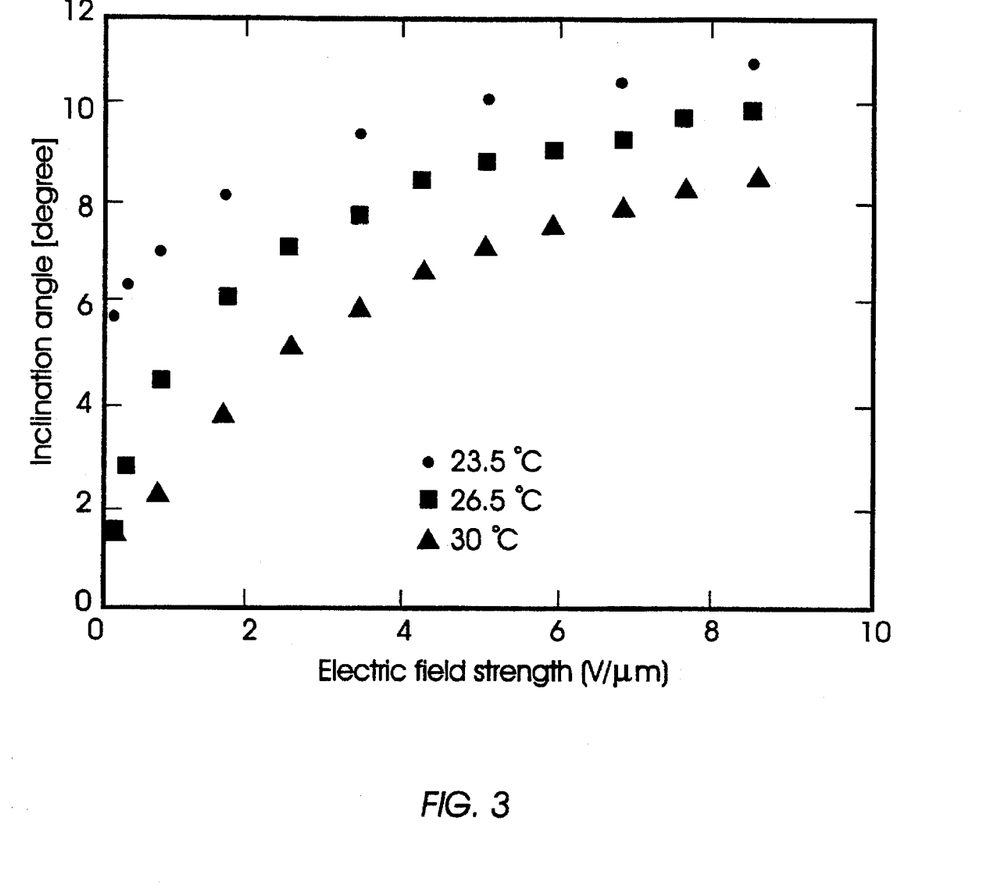
FIG. 3 is a measurement example of an electric-field-induced inclination effect of a liquid crystal.

FIG. 2 qualitatively shows a behavior of the liquid crystal in this device. FIG. 3 shows a quantitative relationship between the strength of the applied electric field and the inclination angle of the liquid crystal. The electric field is applied perpendicularly to the paper surface of FIG. 2. Actually, the electric field is applied not over the entire liquid crystal, but to only a part (top-fight side of a oblique line 210) thereof. The refractive index changes only in the part to which the electric field is applied.

In this state, a light beam is introduced in the y-direction (see FIG. 1). After the light beam has passed through the oblique line 210, in the part of the liquid crystal in which the molecular axes are inclined by the electric field, the optical path length is continuously changed on the same wavefront and the light beam is deflected by an angle that depends on the difference between the refractive indices and the inclination of the oblique line 210 (see FIG. 2(b)).

The reason why the spontaneously polarized liquid crystal is used is that its molecular axes can incline more quickly in response to the electric field, so as to enable provision of an electrooptical device having a high response speed. But it is noted that not every spontaneously polarized liquid crystal can be used in the invention. For example, if respective liquid crystal molecules are oriented in a spiral manner or randomly, the refractive index cannot be changed uniformly and the deflecting function cannot be obtained. In the case of a liquid crystal in the smectic-A state, which is suitable for the invention, the polarization vectors are arranged in a predetermined direction in a layered manner even without the application of an electric field (see FIG. 2). Such polarization vectors are uniformly inclined by an electric field, to thereby provide the uniform deflecting function.

Figure 4A:
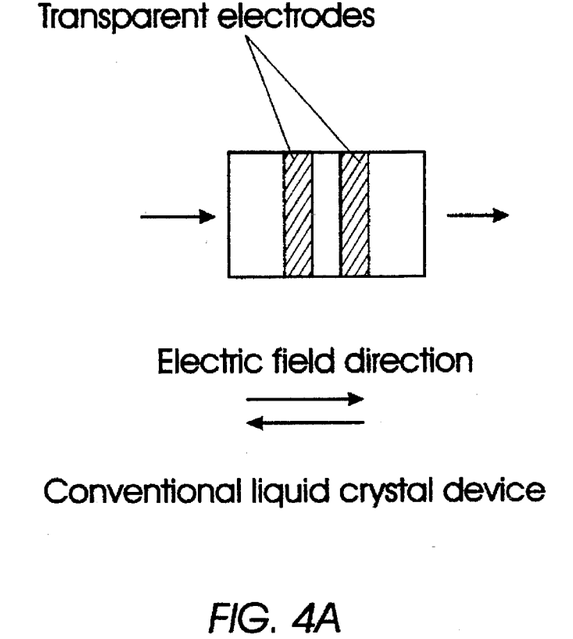
FIG. 4 shows the relationships between the electric field direction and the optical axis direction in a conventional liquid crystal device and a liquid crystal device of the invention.

Furthermore, as shown in FIG. 4, in the invention a light beam is not introduced in parallel with the electric field, in contrast with conventional liquid crystal devices. As the interval between the transparent electrodes increases, the operation voltage increases and the operation speed decreases. As shown in FIG. 4(a), in the conventional scheme in which a light beam is introduced in parallel with the electric field, the optical path length in the liquid crystal is elongated to provide a large deflection angle while the above problem is left unsolved. That is, as the maximum deflection angle is set larger, the electrode interval becomes longer, which requires a higher operation voltage. Thus, the operation speed (response speed) is decreased.

Figure 4B:
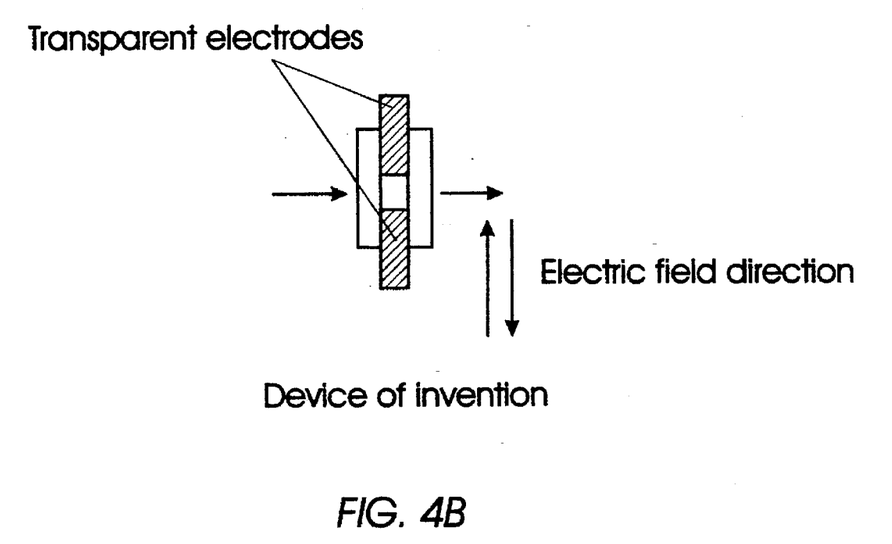

According to the invention, a light beam is introduced perpendicularly to the electric field direction as shown in FIG. 4(b). According to this scheme, it is possible to obtain a large deflection angle by increasing the optical path length, while reducing the operation voltage and increasing the operation speed by making the liquid crystal sufficiently thin. This leads to the advantage of the invention in that a large deflection angle can be obtained while a high response speed is secured in any mode of operation.

The invention has been described above in a very conceptual manner. In practice, the liquid crystal needs to be sealed into a proper case, functions other than the deflection can also be given to this device by adjusting the shape of the electrodes.

Figure 5:
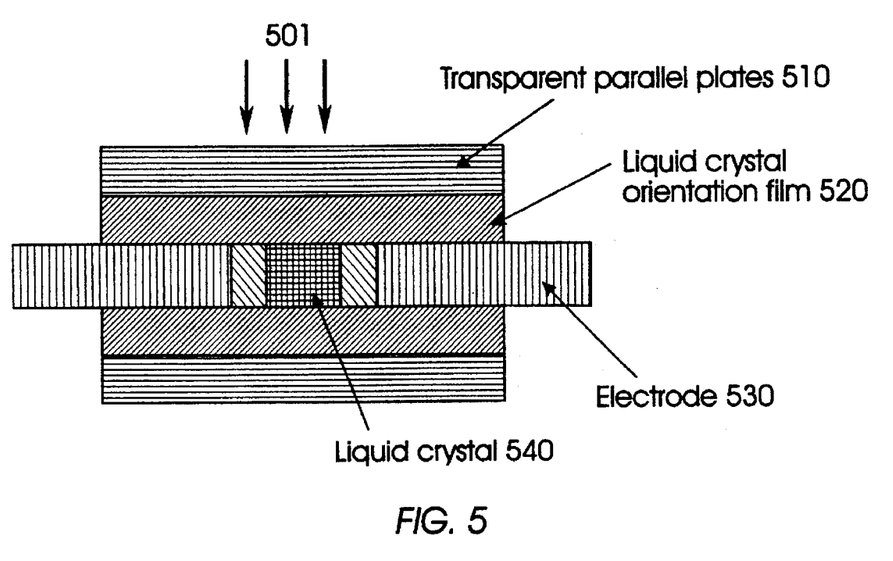
FIG. 5 is a front sectional view of the device of the invention.
Figure 6:
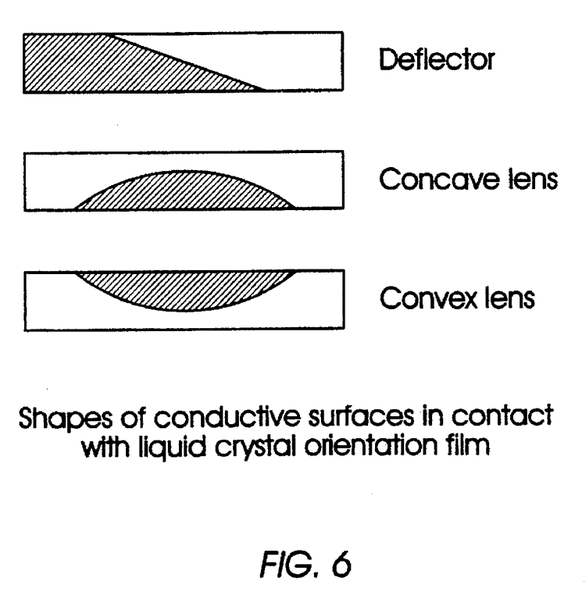
FIG. 6 shows shapes of respective electrode surfaces that are in contact with liquid crystal orientation films in the invention.

FIG. 5 is a schematic front sectional view of a device according to the invention with above factors taken into account. A light beam is introduced in a direction indicated by arrows 501 and enters a liquid crystal 540 through a transparent plate 510 and a liquid crystal orientation film 520 which enclose and seal the liquid crystal 540. When an electric field is applied by means of electrodes 530, whose surfaces facing the liquid crystal 540 through respective liquid crystal orientation films have an inclined profile (see FIG. 6(a)), the refraction is continuously effected in a predetermined direction as shown in FIG. 2. Thus, a deflector is realized. The liquid crystal orientation film 520 is an organic coating of, for instance, polyimide, and serves to preliminarily orient the axes of the liquid crystal molecules in a predetermined direction. To preliminarily orient the liquid crystal molecules, other methods may be employed; for example, the whole device may be placed in a magnetic field in advance. In FIG. 6, shaded portions represent actual electrode portions. As mentioned above, the electrode interval is related to the operation speed in which a shorter interval provides a higher operation speed. However, in view of a practical size of a light beam, the proper electrode interval is several tens of micrometers. Furthermore, the deflection angle is proportional to the optical path length in the liquid crystal. However, an excessively long optical path in the liquid crystal is not preferable in terms of transmittance. It would be appropriate to limit the optical path length to less than several millimeters.

Various functions can be realized by changing the shape of the electrodes. This is based on the feature of the invention that only the liquid crystal molecules in the part to which an electric field is applied from the electrodes can be inclined selectively and the refractive index can be changed only in that part. For example, a uniaxial, variable-focal-length concave lens can be realized by making the electrodes have a spindle shape as shown in FIG. 6(b). A convex lens can be realized by hollowing a spindle-shaped portion out of the electrode materials as shown in FIG. 6(c).

Figure 7:
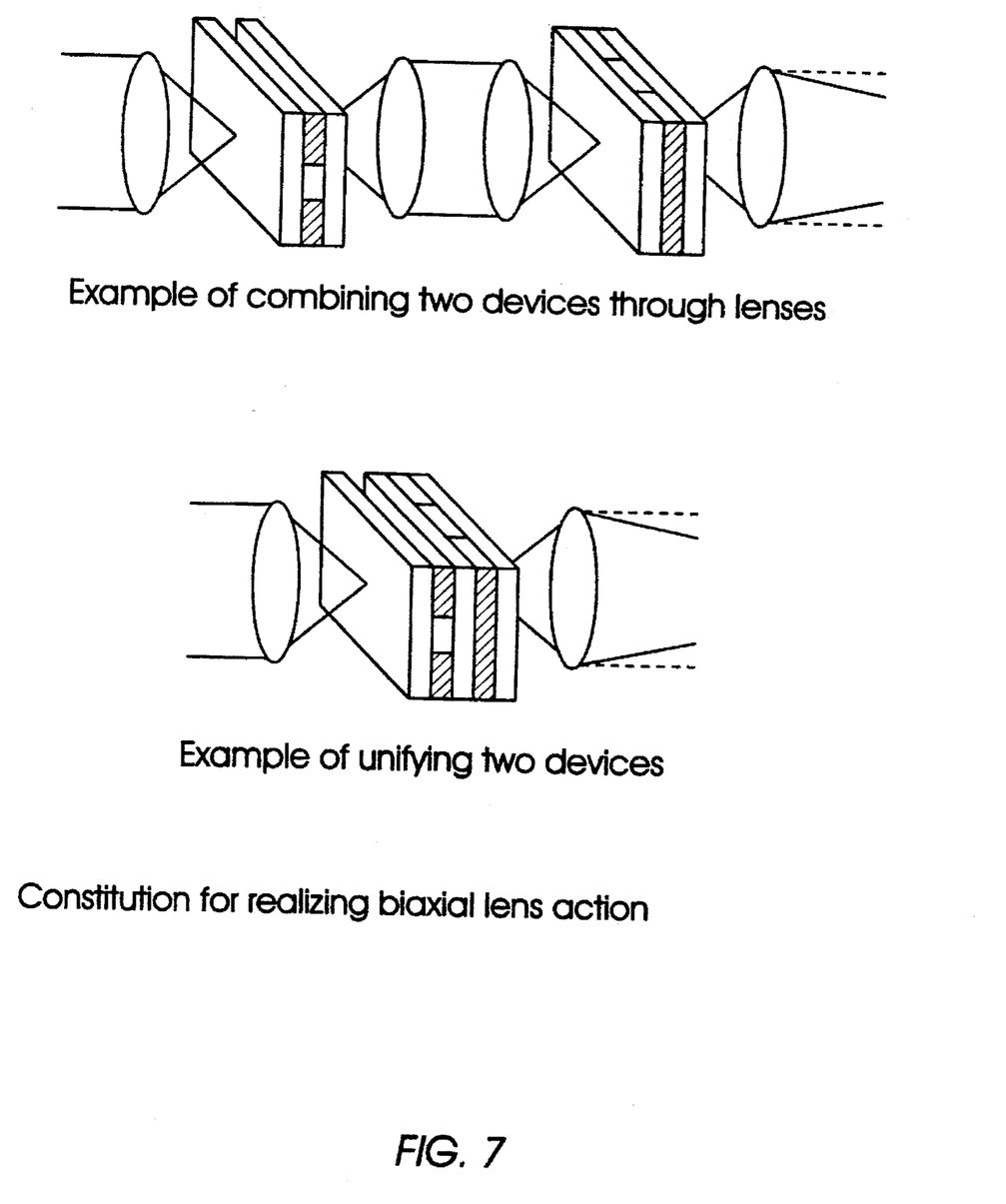
FIG. 7 schematically shows two examples in which devices of the invention serve as biaxial lenses.

In the case of providing a convex lens, an aspherical lens with small wavefront aberrations can be constructed by properly shaping the electrodes in accordance with the required performance. If a single device of the invention is employed, a uniaxial lens action as in a cylindrical lens is obtained. On the other hand, if two devices are disposed in an orthogonal arrangement with the use of additional spherical lenses as shown in FIG. 7, a biaxial lens action, such as that in an ordinary spherical lens, can be obtained.

Figure 8:
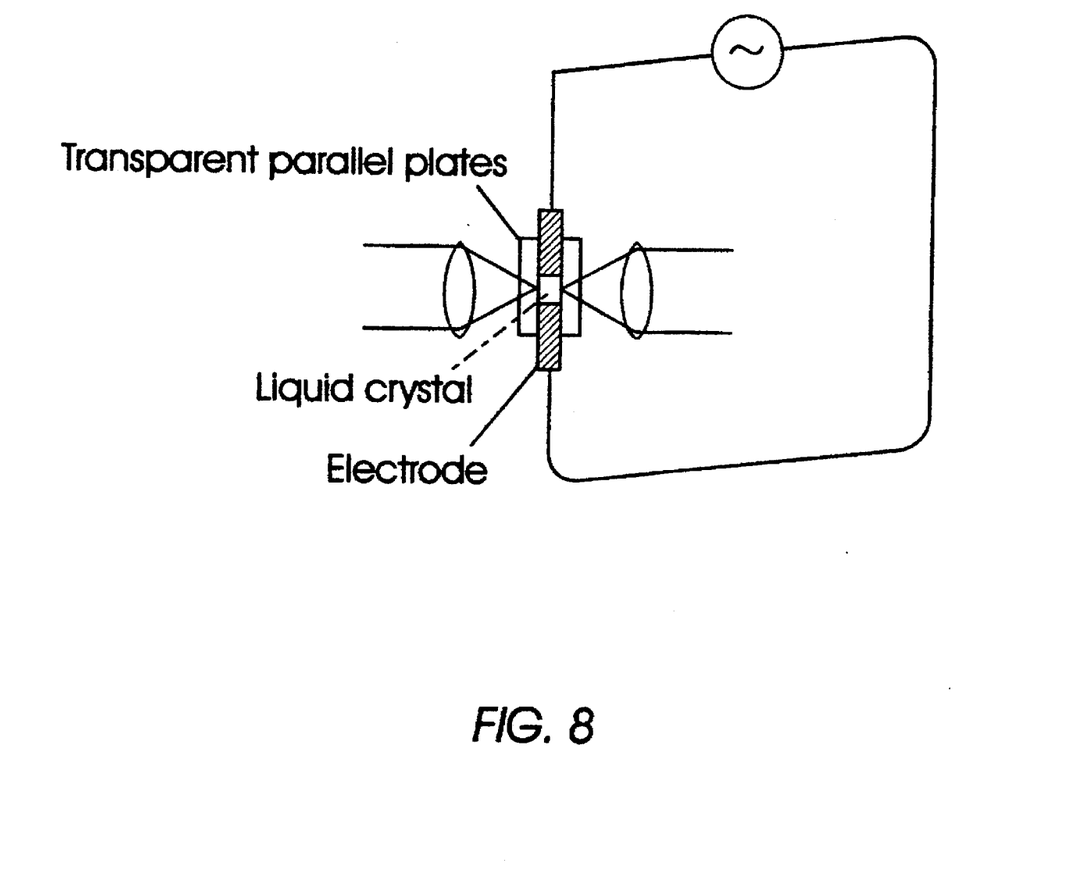
FIG. 8 shows a method of using the device of the invention to deflect a large-diameter light beam.

FIG. 8 shows a case of deflecting a light beam having a large diameter by the device of the invention. As shown in FIG. 8, the diameter of an input light beam is reduced by a light beam diameter reducing optical system so as to become smaller than the electrode interval. After the light beam is deflected (or subjected to another function) by the device of the invention, its diameter is increased by an enlarging optical system to a desired size.

The devices according to the invention can be applied to a variety of fields. For example, the present invention can solve the problems, such as a high operation voltage and a low response speed, of presently available switches for optical communication. If the lens mechanism of the invention is employed in an autofocus camera, it becomes more resistant to vibration due to the absence of mechanical motion. Furthermore, it is expected that the devices of the invention can be applied to a wide variety of fields including laser printers, displays, and an magnetooptical disc devices.

Devices having a low operation voltage and a very high response speed can be constructed by employing the mechanism of the invention. Quantitatively, the device of the invention can provide a response speed about 1,000 times higher than that of a conventional device using a nematic liquid crystal.

What is claimed is:

1. A method of changing a path of an input light beam, comprising the steps of:

orienting in advance the molecular axes of a spontaneously polarized, ferroelectric, or antiferroelectric liquid crystal in a predetermined direction;

applying an electric field to said liquid crystal by a pair of electrodes whose surfaces in contact with the liquid crystal have an inclined profile or lens-shape to realize a focusing function, so as to cause said molecular axes to incline by an electric-field-induced inclination effect; and introducing a light beam perpendicular to a direction of said electric field.

2. The method according to claim 1, wherein said liquid crystal is in a smectic-A phase.

* * * * *